US009623716B2

(12) United States Patent
Cox

(10) Patent No.: US 9,623,716 B2
(45) Date of Patent: Apr. 18, 2017

(54) SUSPENSION WITH HYDRAULIC PRELOAD ADJUST

(71) Applicant: Fox Factory, Inc., Scotts Valley, CA (US)

(72) Inventor: Christopher Paul Cox, Capitola, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 14/995,098

(22) Filed: Jan. 13, 2016

(65) Prior Publication Data

US 2016/0129750 A1 May 12, 2016

Related U.S. Application Data

(63) Continuation of application No. 14/293,927, filed on Jun. 2, 2014, now Pat. No. 9,248,717, which is a continuation of application No. 13/758,330, filed on Feb. 4, 2013, now Pat. No. 8,770,592.

(60) Provisional application No. 61/594,886, filed on Feb. 3, 2012.

(51) Int. Cl.
*B60G 17/027* (2006.01)
*B60G 17/015* (2006.01)
*B60G 15/06* (2006.01)

(52) U.S. Cl.
CPC ....... *B60G 17/0272* (2013.01); *B60G 15/065* (2013.01); *B60G 17/0152* (2013.01); *B60G 2202/312* (2013.01); *B60G 2400/10* (2013.01); *B60G 2400/25* (2013.01); *B60G 2401/17* (2013.01); *B60G 2500/22* (2013.01)

(58) Field of Classification Search
None
See application file for complete search history.

(56) References Cited

U.S. PATENT DOCUMENTS

| | | | |
|---|---|---|---|
| 2,902,274 A | 9/1959 | McIntyre | |
| 3,986,118 A | 10/1976 | Madigan et al. | |
| 4,050,684 A | 9/1977 | Sanders | |
| 4,310,149 A | 1/1982 | Camilleri | |
| 5,952,823 A | 9/1999 | Sprecher et al. | |
| 6,073,536 A | 6/2000 | Campbell et al. | |
| 7,360,776 B2 | 4/2008 | Bryant | |
| 7,374,028 B2 | 5/2008 | Fox | |
| 8,770,592 B2 | 7/2014 | Cox et al. | |
| 9,248,717 B2 * | 2/2016 | Cox .................. | B60G 17/0272 |
| 2005/0189685 A1 | 9/2005 | Verriet | |
| 2009/0108546 A1 | 4/2009 | Ohletz et al. | |
| 2009/0236807 A1 | 9/2009 | Wootten et al. | |
| 2010/0170760 A1 | 7/2010 | Marking | |
| 2010/0181709 A1 | 7/2010 | Laird et al. | |
| 2010/0219572 A1 | 9/2010 | Back | |
| 2010/0308518 A1 | 12/2010 | Michel | |
| 2011/0291338 A1 | 12/2011 | Pepka | |

* cited by examiner

*Primary Examiner* — Darlene P Condra

(57) ABSTRACT

A shock absorber for a vehicle having a damper and a first and second springs mounted coaxially around the damper and a preload adjuster for partially compressing at least one of the springs independently of the compression stroke. In one embodiment the preload adjuster is remotely controllable. In another embodiment the shock absorber includes an additional mechanism for preloading at least one of the springs.

10 Claims, 4 Drawing Sheets

SUSPENSION WITH HYDRAULIC PRELOAD ADJUST

CROSS-REFERENCE TO RELATED APPLICATIONS

This application claims priority to and is a continuation of the patent application Ser. No. 14/293,927, entitled "SUSPENSION WITH HYDRAULIC PRELOAD ADJUST," with filing date Jun. 2, 2014, by Christopher Paul Cox, which is incorporated herein, in its entirety, by reference.

The application with Ser. No. 14/293,927 claims priority to and is a continuation of the patent application Ser. No. 13/758,330 and now issued U.S. Pat. No. 8,770,592, entitled "SUSPENSION WITH HYDRAULIC PRELOAD ADJUST," with filing date Feb. 4, 2013, by Christopher Paul Cox, which is incorporated herein, in its entirety, by reference.

The application with Ser. No. 13/758,330 claims priority to the patent application Ser. No. 61/594,886, entitled "SUSPENSION WITH HYDRAULIC PRELOAD ADJUST," with filing date Feb. 3, 2012, by Christopher Paul Cox, which is incorporated herein, in its entirety, by reference.

BACKGROUND OF THE INVENTION

Field of the Invention

Embodiments of the invention generally relate to a damper assembly for a vehicle. More specifically, certain embodiments relate to spring preload adjustment used in conjunction with a vehicle suspension.

Description of the Related Art

Vehicle suspension systems typically include a spring component or components and a damping component or components. Typically, mechanical springs, like helical springs, are used with some type of viscous fluid-based damping mechanism and the two are mounted functionally in parallel. In some instances, features of the damper or spring are user-adjustable. What is needed is an improved method and apparatus for varying spring preload characteristics.

SUMMARY OF THE INVENTION

The present invention generally includes a shock absorber for a vehicle having a damper and a first and second springs mounted coaxially around the damper and a preload adjuster for partially compressing at least one of the springs independently of the compression stroke. In one embodiment the preload adjuster is remotely controllable. In another embodiment the shock absorber includes an additional mechanism for preloading at least one of the springs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As used herein, the terms "down," "up," "downward," "upward," "lower," "upper" and other directional references are relative and are used for reference only.

Figure 1:
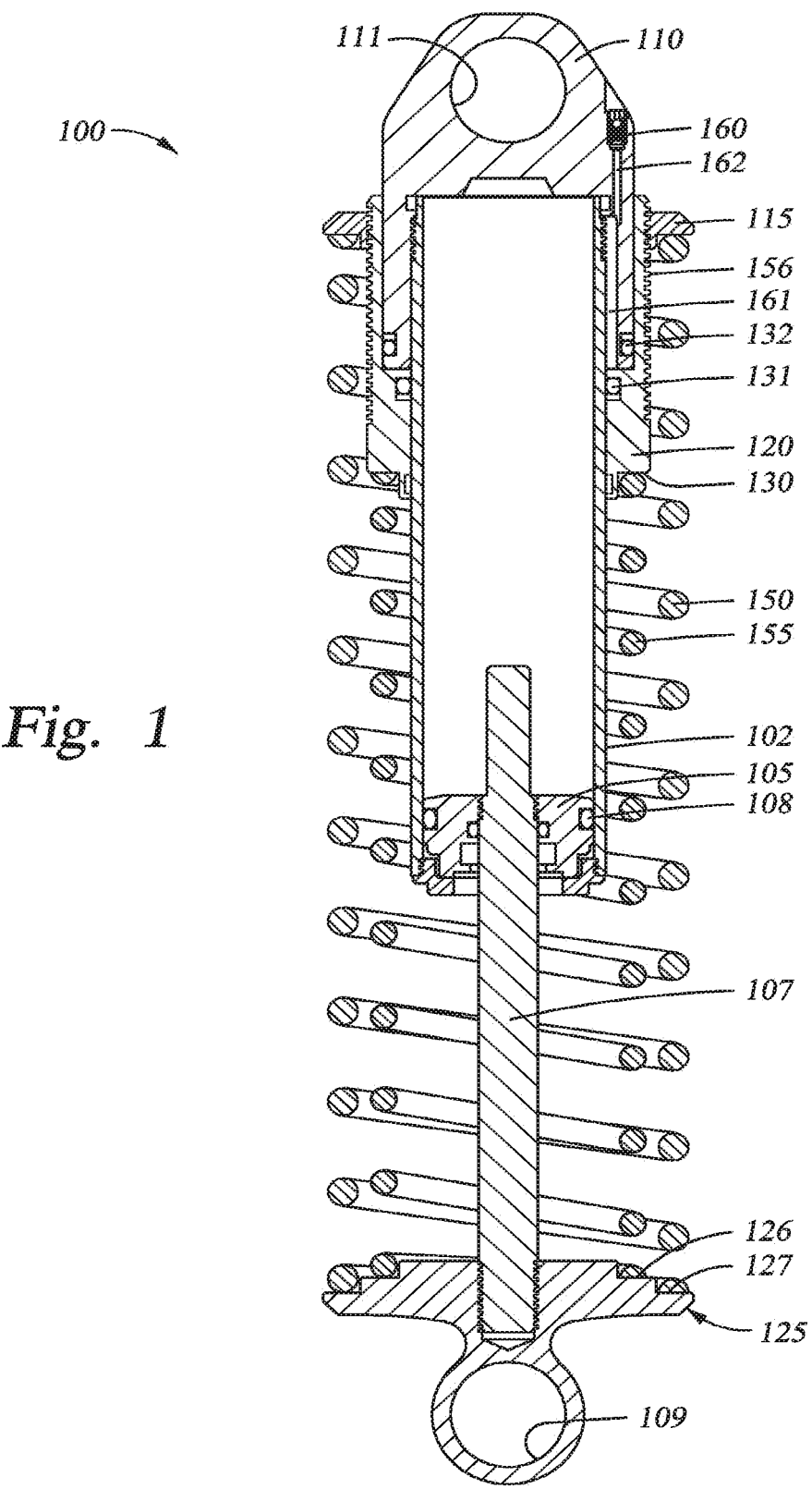
FIG. 1 is a section view of a shock absorber having two coaxial springs, both of which are pre-loadable.
Figure 2:
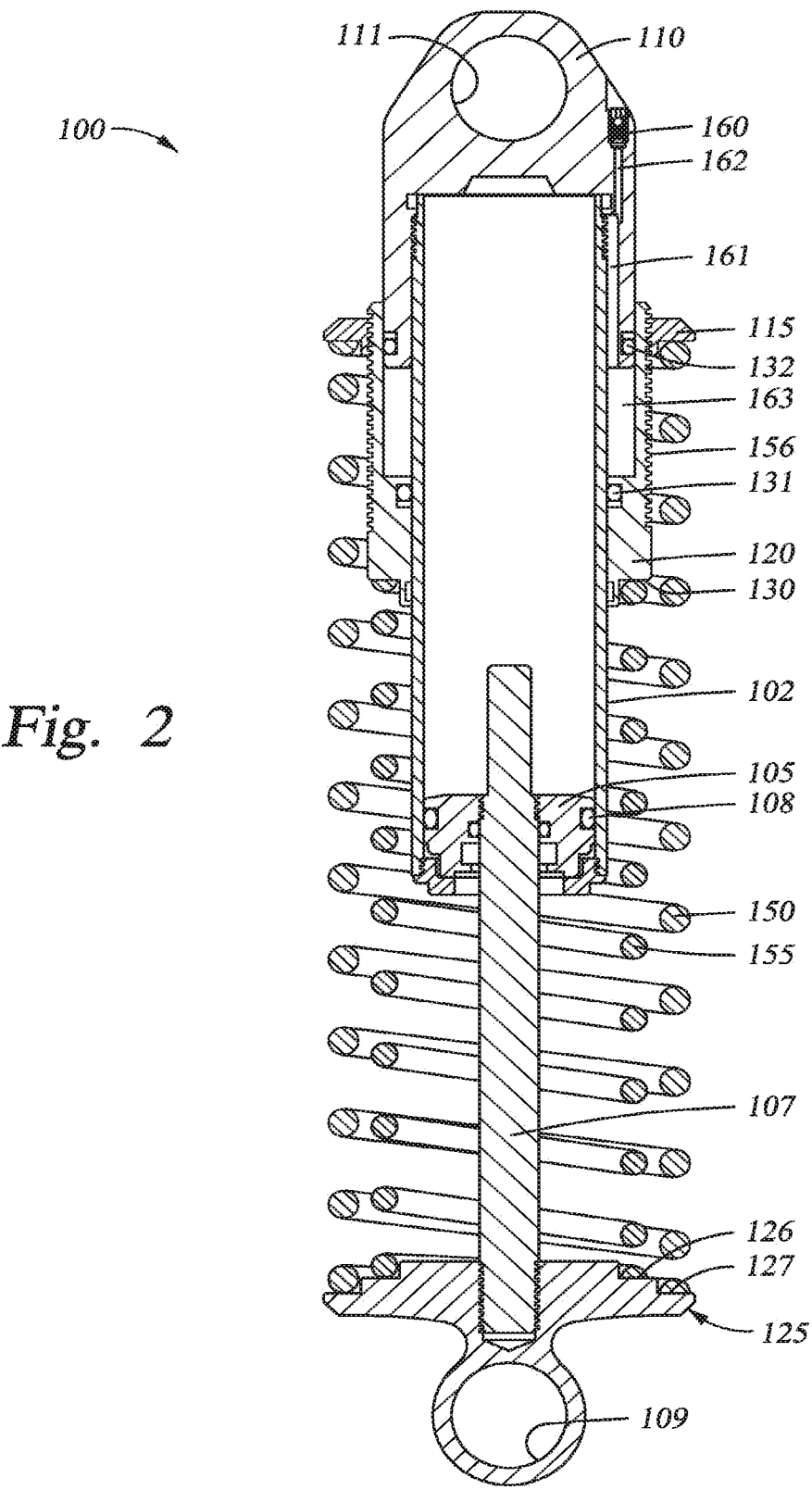
FIG. 2 is a section view of the shock absorber of FIG. 1 in which the spring members are pre-loaded.
Figure 3:
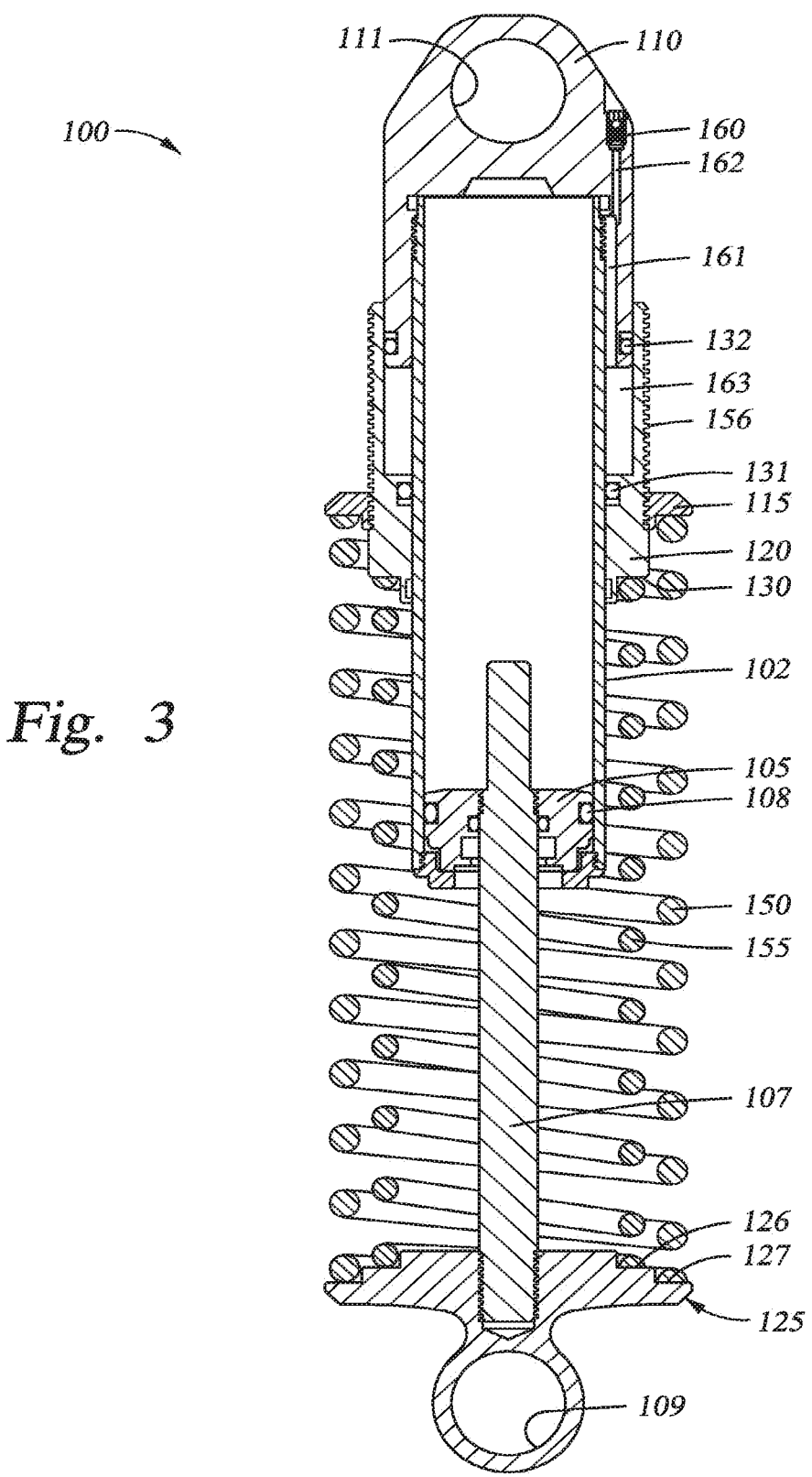
FIG. 3 is a section view of the shock absorber illustrating an independent way of pre-loading one of the springs relative to eh other spring.

FIGS. 1-3 illustrate a shock absorber 100 having damper and spring functions. In the Figures the shock is shown in its most extended (rebound) position. The damper 100 includes a cylinder 102 with a rod 107 and a piston 105 which is sealed in the cylinder with a seal 108. In one embodiment, as the piston 105 moves in a compression or rebound stroke, fluid meters from one side of the piston 105 to the other side by passing through flow paths (not shown) formed in the piston 105. Typically, shims are used to partially obstruct flow paths through the piston 105 in each direction. By selecting shims having certain desired stiffness characteristics, the dampening effects caused by the piston 105 as it travels through the fluid can be increased or decreased, and dampening rates can be different between the compression and rebound strokes of the piston 105.

A reservoir (not shown) is typically in fluid communication with the damper cylinder 102 for receiving and supplying damping fluid as the piston rod 107 moves in and out of the cylinder. The reservoir includes a cylinder portion 128 in fluid communication with the damper cylinder 102. Certain features of reservoir type dampers are shown and described in U.S. Pat. No. 7,374,028, which is incorporated herein, in its entirety, by reference. One end of the piston rod 107 is supplied with an eyelet 109 for connecting to a portion of a vehicle wheel suspension linkage. An opposite end (opposite the piston), is supplied with an eyelet 111 to be mounted to another portion of the vehicle, such as the frame, that moves independently of the first part.

In one embodiment, as shown in all of the figures, a closure 110, is constructed and arranged to thread onto an end of cylinder 102 and engage telescopically with a preload piston 120. The preload piston is slidable relative to and sealed against (by seal 131) an exterior surface of cylinder 102 and is also slidably sealed against an exterior of the closure 110 by seal 132.

The preload piston includes two separate spring axial abutment structures. Shown are large diameter abutment 115 and a small diameter abutment 130. A spring abutment 125 is attached at an opposite end of rod 107, adjacent a lower connecting eye. As shown in the figures, abutment 125 may be stepped with two surfaces 126, 127 and of sufficient diameter to support either the lower end of a large diameter spring 150 or a small diameter spring 155 or both simultaneously (as shown).

In one embodiment, a preload adjuster assembly includes a hydraulic fluid flow path comprising fill fitting 160, flow path 161, 162 and piston chamber 163 (visible in FIG. 2). In practice, one or more springs are mounted to abut surfaces 125 and one or both of 115 and 130. FIG. 1 shows the shock absorber in the "minimum extension" position (no hydraulic fluid in chamber 163) as it is shown in FIG. 1. The springs 150, 155 so mounted will be in their most compliant state due to minimum preload (i.e. pre-compression). When greater preload and hence more rigid vehicle ride are desired, fluid is introduced manually or via onboard hydraulic reservoir and pump, into port 160. The fluid then flows through paths 161, 162 and begins to expand chamber 163. As chamber 163 expands due to fluid fill (see FIG. 2), the piston 120 moves axially, compressing spring 150, 155 against abutment 125 (between the abutment 130 and or 115). The result is a stiffer spring.

In the embodiment shown in the Figures, both springs 150, 155 are acted upon by the preload piston 120 causing both to become more or less compressed as the preload piston 120 moves in relation to the fluid in chamber 163. However, it will be understood that either of the springs could be independently mounted wherein it is not affected at all by the expansion and contraction of the chamber 163.

While the embodiment described presumes chamber 163 of the preload adjuster is operated with relatively non-compressible fluid, compressible fluid such as gas may be used in the chamber to create a composite spring rate comprising compressible gas and mechanical spring.

While the embodiment described includes springs coaxially arranged around a fluid damper, the spring could be used in conjunction with an air spring, especially one that is combined in a central cylinder member with a damper. An example of a combination air spring/damper is taught in U.S. Patent Application Publication No. 2009/0236807 A1 and that publication is incorporated herein in its entirety.

In the embodiment shown, large diameter abutment 115 holding larger diameter spring 150 at one end is independently adjustable relative to the other spring 155 and the chamber. Independent adjustment is provided by a threaded relationship 156 between the abutment 115 and the outer diameter of the chamber. For example, in FIGS. 1, 2 the abutment is located near an end of the chamber wall. In FIG. 3, however, abutment 115 has been threadedly moved axially along the cylinder to a location closer to an opposite end of the chamber. In this manner, additional preload is placed upon the larger diameter spring 150 separate and apart from preload supplied by the preload piston 120. While the independent adjustment feature is shown in relation to the larger diameter spring 150, it will be understood that such a feature could be associated with either or both springs. Additionally, any number of springs (including a single spring) can be used with their ends mounted at various locations along a length of the cylinder 102.

Figure 4:
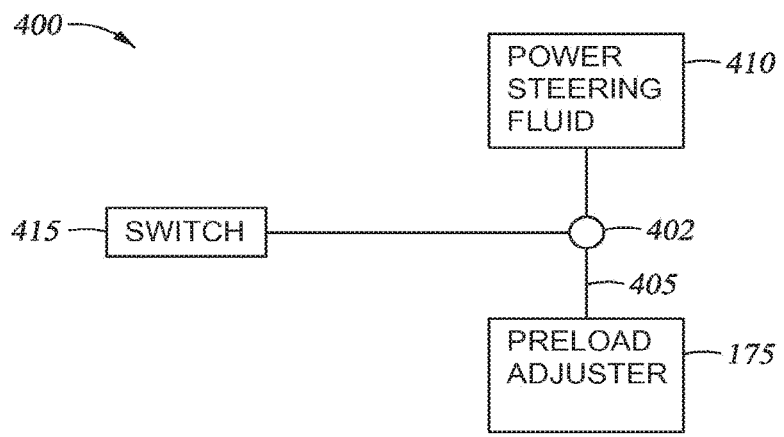
FIG. 4 is a schematic diagram showing a control arrangement for a remotely operated bypass.

The preload adjuster may be automated such that onboard load sensing associated with a vehicle adjusts the spring rate based on sensed operational conditions and microprocessor-controlled fluid introduction into one or more preload adjusters on the vehicle (e.g. 4 on a 4 wheeler), FIG. 4 is a schematic diagram illustrating a sample circuit 400 used to provide remote control of a preload adjuster using a vehicle's power steering fluid (although any suitable fluid pressure source may be substituted for reservoir 410 as could an electrical current source in the case of an electrically actuated valve member 175). As illustrated, a fluid pathway 405 having a switch-operated valve 402 therein runs from a fluid (or current) reservoir 410 that is kept pressurized by, in one embodiment, a power steering pump (not shown) to a preload adjuster that is operable, for example, by a user selectable dash board switch 415. The valve 402 permits fluid to travel to the adjuster, thereby urging it to an expanded position. When the switch 415 is in the "off" position, the adjuster is in its compressed position and no additional preload is placed on the springs. Hydraulically actuated valving for use with additional components is shown and described in U.S. Pat. No. 6,073,536 and that patent is incorporated by reference herein in its entirety. While FIG. 4 is simplified and involves control of a single preload adjuster, it will be understood that the valve 402 could be plumbed to simultaneously provide a signal to two or more adjusters, one related to each wheel of a vehicle, for instance.

A remotely operable preload adjuster like the one described above is particularly useful with on/off road vehicles. These vehicles can have as much as 20" of shock absorber travel to permit them to negotiate rough, uneven terrain at speed with usable shock absorbing function. In off-road applications, compliant shock absorbing is necessary as the vehicle relies on its long travel suspension when encountering off-road obstacles. However, operating a vehicle with very compliant, long travel suspension on a smooth road at higher speeds can be problematic due to the springiness/sponginess of the suspension. Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated preload adjuster described herein, spring characteristics of a shock absorber can be completely changed from a compliantly dampened "springy" arrangement to a "stiffer" system ideal for higher speeds on a smooth road.

Figure 5:
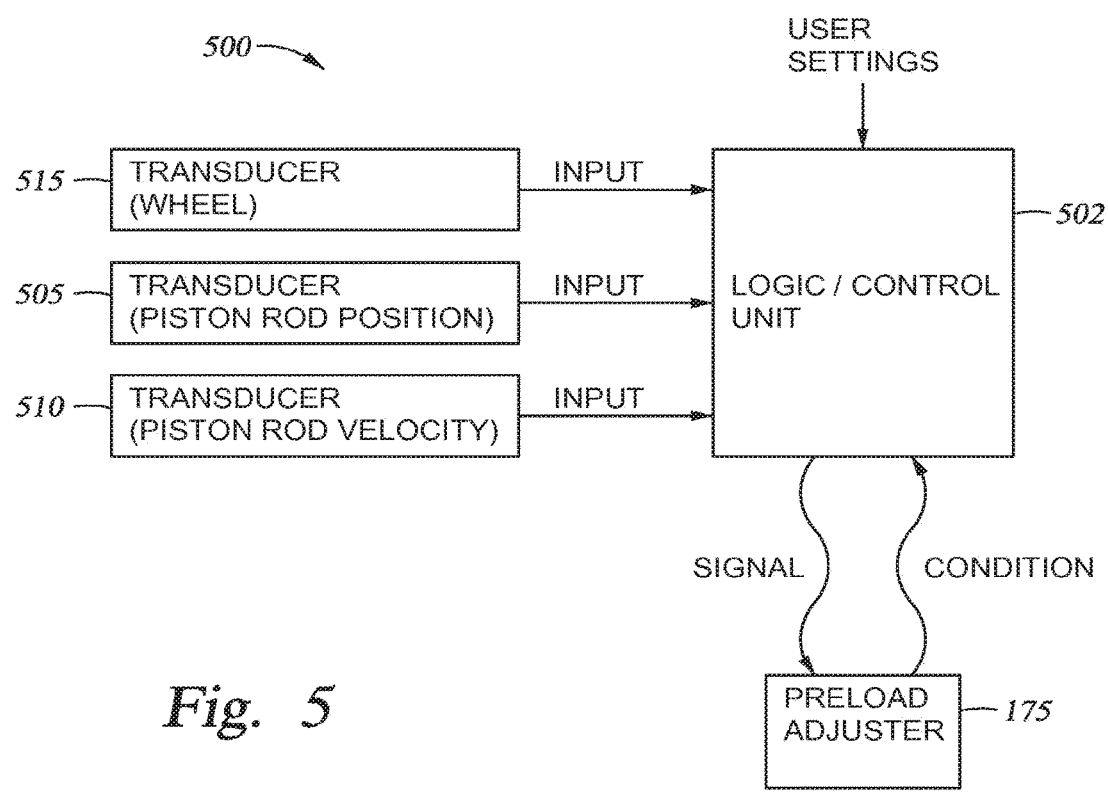
FIG. 5 is a schematic diagram showing another control arrangement for a remotely operated bypass.

In addition to, or in lieu of, the simple, switch operated preload adjuster arrangement of FIG. 4, the preload adjuster can be operated automatically based upon one or more driving conditions. FIG. 5 shows a schematic diagram of a remote control system 500 based upon any or all of vehicle speed, damper rod speed, and damper rod position. One embodiment of FIG. 5 is designed to automatically increase spring compression in a shock absorber in the event a damper rod reaches a certain velocity in its travel towards the bottom end of travel at a predetermined speed of the vehicle. In one embodiment, the system adds stiffness (and control) in the event of rapid operation (e.g. high rod velocity) to avoid a bottoming out of the rod as well as a loss of control that can accompany rapid compression of a shock absorber with a relative long amount of travel. In one embodiment, the system adds stiffness (e.g. expands the chamber 163) in the event that the rod velocity in compression is relatively low, but the rod progresses past a certain point in the travel. Such configuration aids in stabilizing the vehicle against excessive low rare suspension movement events such as cornering roll, braking and acceleration yaw and pitch and "g-out."

FIG. 5 illustrates, for example, a system including three variables: rod speed, rod position and vehicle speed. Any or all of the variables shown may be considered by processor 502 in controlling the valve 175. Any other suitable vehicle operation variable may be used in addition to or in lieu of the variables 515, 505, 510 such as, for example, piston rod compression strain, eyelet strain, vehicle mounted accelerometer data or any other suitable vehicle or component performance data. In one embodiment, a suitable proximity sensor or linear coil transducer or other electro-magnetic transducer is incorporated in the dampening cylinder to provide a sensor to monitor the position and or speed of the piston (and suitable magnetic tag) with respect to the cylinder.

In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, digital or analog, proportional to the calculated distance and I or velocity. Such a transducer-operated arrangement for measuring rod speed and velocity is described in U.S. Pat. No. 5,952,823 and that patent is incorporated by reference herein in its entirety.

While a transducer assembly measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive cons having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 5, a logic unit 502 with user-definable settings receives inputs from the rod speed 510 and location 505 transducers as well as the wheel speed transducer 515. The logic unit is user-programmable and depending on the needs of the operator, the unit records the variables, and then if certain criteria are met, the logic circuit sends its own signal to the preload adjuster to either expand or contract. Thereafter, the condition of the preload adjuster 175 is relayed back to the logic unit 502.

In one embodiment, the logic shown in FIG. 5 assumes a single shock absorber but the logic circuit is usable with any number of shocks or groups of shocks. For instance, the shock absorbers on one side of the vehicle can be acted upon while the vehicle's other shocks remain unaffected.

While the examples illustrated relate to manual operation and automated operation based upon specific parameters, the remotely operated preload adjuster can be used in a variety of ways with many different driving and road variables. In one example, the preload adjuster is controlled based upon vehicle speed in conjunction with the angular location of the vehicle's steering wheel. In this manner, by sensing the steering wheel turn severity (angle of rotation), additional stiffness can be applied to one shock or one set of shocks on one side of the vehicle (suitable, for example, to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to the preload adjuster positioning in response thereto. In another example, the preload adjuster can be controlled at least in part by a pressure transducer measuring pressure in a vehicle tire and adding or subtracting stiffness characteristics to some or all of the wheels in the event of, for example, an increased or decreased pressure reading. In still another example, a parameter might include a gyroscopic mechanism that monitors vehicle trajectory and identifies a "spin-out" or other loss of control condition and adds and/or reduces spring stiffness to some or all of the vehicle's shock absorbers in the event of a loss of control to help the operator of the vehicle to regain control.

While the foregoing is directed to embodiments of the invention, other and further embodiments of the invention may be devised without departing from the basic scope thereof, and the scope thereof is determined by the claims that follow.

The invention claimed is:

1. A suspension comprising:
    a plurality of shock absorbers, each of said plurality of shock absorbers comprising:
        a damper having a piston and rod therein; and
        a plurality of springs mounted around the damper, the springs to become compressed during a compression stroke of the damper; and
        a remotely controlled preload adjuster to partially compress or expand one or more of the plurality of springs independently of the compression stroke; and
    a logic unit to send a signal to the remotely controlled preload adjuster, the signal to partially compress or expand one or more of the plurality of springs.

2. The suspension of claim 1, wherein each of the plurality of shock absorbers has its own logic unit coupled therewith.

3. The suspension of claim 1, wherein every of the plurality of shock absorbers of the suspension is coupled with a single logic unit.

4. The suspension of claim 1, further comprising:
    an angular location monitor of a steering wheel, the angular location monitor to:
        sense a steering wheel turn severity; and
        signal the logic unit to send a signal to the remotely controlled preload adjuster to adjust a stiffness of one or more of the plurality of shock absorbers when a sharp turn of the steering wheel is sensed.

5. The suspension of claim 4, further comprising:
    a speed monitor to determine a speed of a vehicle, the speed monitor to provide a velocity input to be used in conjunction with the steering wheel turn severity in the signal to the remotely controlled preload adjuster to apply additional stiffness to one or more of the plurality of shock absorbers.

6. The suspension of claim 1, further comprising:
    a steering transducer to monitor one or more steering components of the suspension, the steering transducer to:
        measure axle force and/or moments applied to the one or more steering components of the suspension; and
        signal the logic unit to send a signal to the remotely controlled preload adjuster to adjust a stiffness of one or more of the plurality of shock absorbers when a change in the one or more steering components of the suspension is sensed.

7. The suspension of claim 6, wherein the one or more steering components are a tie rods.

8. The suspension of claim 1, further comprising:
a pressure transducer to monitor one or more tire pressures, the pressure transducer to:
 measure a tire pressure of one or more tires of the suspension; and
 signal the logic unit to send a signal to the remotely controlled preload adjuster to adjust a stiffness of one or more of the plurality of shock absorbers when a change in the tire pressure of one or more tires is sensed.

9. The suspension of claim 1, further comprising:
a gyroscope to monitor a vehicle trajectory, the gyroscope to:
 measure the vehicle trajectory for a loss of control condition; and
 signal the logic unit to send a signal to the remotely controlled preload adjuster to adjust a stiffness of one or more of the plurality of shock absorbers when the loss of control condition is sensed.

10. The suspension of claim 9, wherein the loss of control condition is a spin-out.

* * * * *